United States Patent [19]
Herrington

[11] 3,876,933
[45] Apr. 8, 1975

[54] RESISTANCE MEASURING INSTRUMENT WITH LINEARIZED DIGITAL READOUT

[75] Inventor: Lawrence Herrington, Garden Grove, Calif.

[73] Assignee: International Telephone and Telegraph Corporation, New York, N.Y.

[22] Filed: Dec. 28, 1973

[21] Appl. No.: 429,353

[52] U.S. Cl............ 324/62; 324/99 D; 340/347 NT
[51] Int. Cl............................................. G01r 27/02
[58] Field of Search...... 324/62, 99 D; 340/347 NT, 340/347 C

[56] References Cited
UNITED STATES PATENTS

| | | | |
|---|---|---|---|
| 3,711,850 | 1/1973 | Kelly...................................... | 324/62 |
| 3,747,089 | 7/1973 | Sharples........................ | 324/99 D X |
| 3,766,474 | 10/1973 | MacDonald....................... | 324/99 D |
| 3,786,350 | 1/1974 | Munt.................................. | 324/62 |

OTHER PUBLICATIONS
Ammann, Noise-Proofing a Digital Voltmeter With Off-the-Shelf Micro-electronics, Electronics, Nov. 16, 1964, pp. 92-94 & 96.

Primary Examiner—Stanley T. Krawczewicz
Attorney, Agent, or Firm—William T. O'Neil

[57] ABSTRACT

A device for measurement of electrical resistance in low or megohm ranges. In low scale operation the unknown resistance is subjected to a constant current source of known value and a digital voltmeter calibrated in resistance units provides the reading. The voltmeter utilizes a double ramp arrangement which integrates the voltage across the unknown resistance for a predetermined count and then integrates back against a reference to the initial level thereby providing a countable measure of resistance value. In the megohm ranges, the unknown is subjected to a regulated 500 volt test voltage and the current through a series sensing resistor measured by a digital voltmeter also calibrated in resistance units. The double ramp integrator operation is reversed, i.e., it integrates against the reference first and back to the initial level at a slope determined by the unknown resistance. The result is that a hyperbolic relationship exists which linearizes the measurement since it is opposite to the hyperbolic relationship inherent of the basic measurement technique.

9 Claims, 14 Drawing Figures

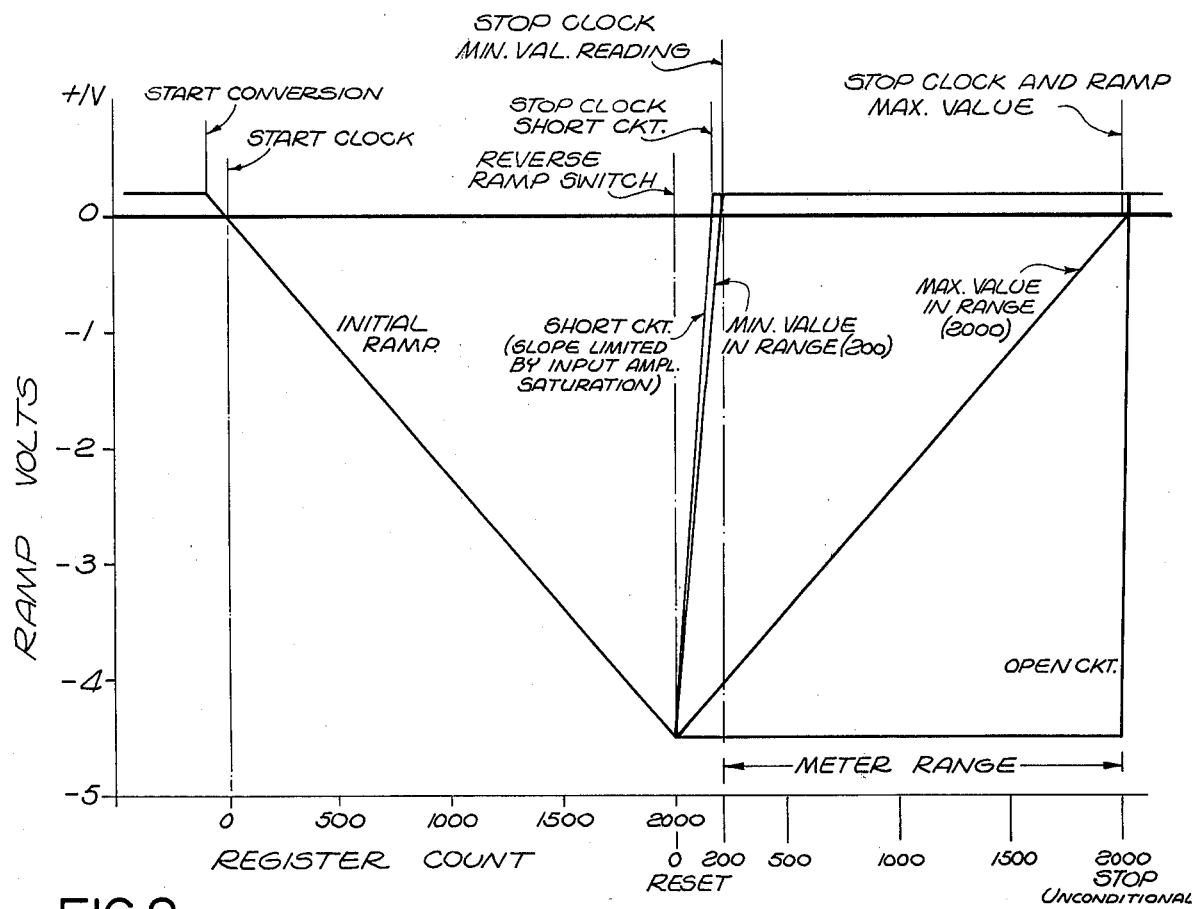
FIG.2. RAMP VOLTS VS. REGISTER COUNT (MEGOHM SCALES)
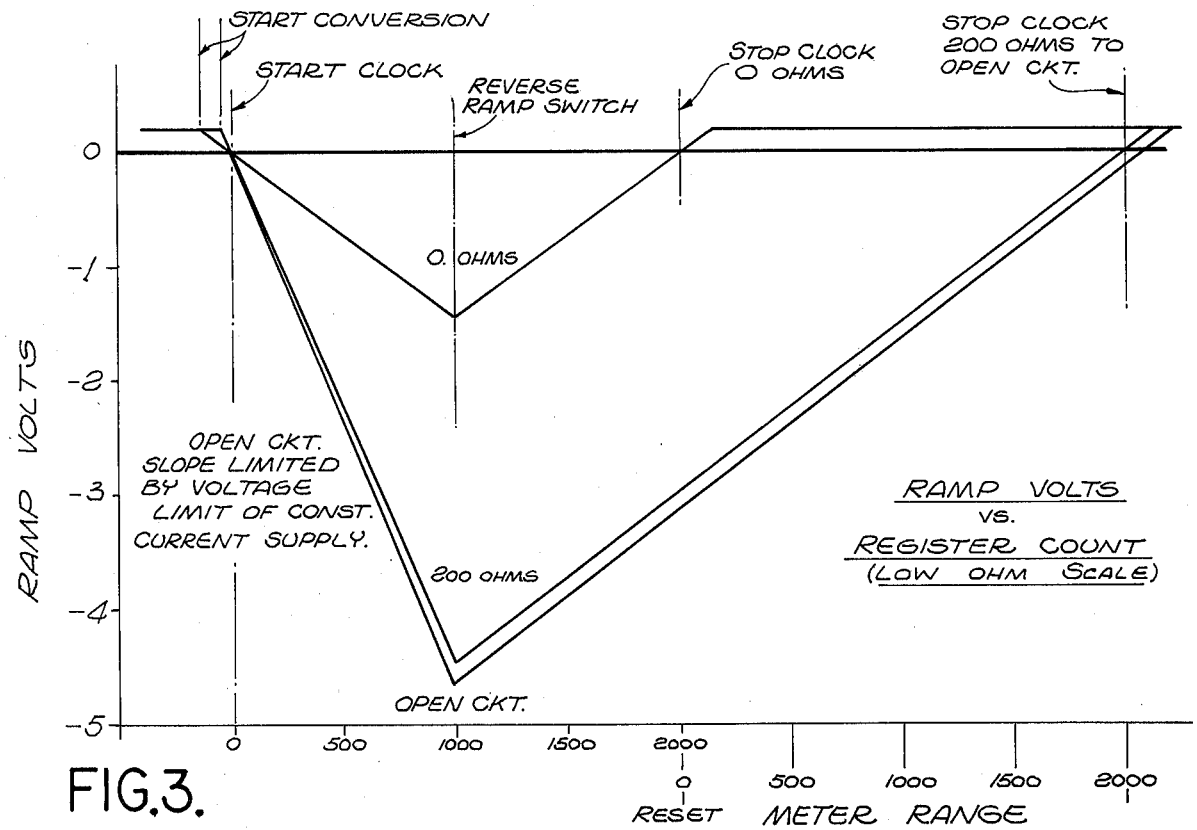
FIG.3. RAMP VOLTS VS. REGISTER COUNT (LOW OHM SCALE)

7 BAR LED Display

RESISTANCE MEASURING INSTRUMENT WITH LINEARIZED DIGITAL READOUT

BACKGROUND OF THE INVENTION

1. Description of the Prior Art

In the prior art, the measurement of resistance has been accomplished by analog (usually electromechanical) methods since the earliest advent of electrical measuring instruments. More recently digital techniques have been employed for the purpose. For the measurement of relatively small values of resistance, the basic analog prior art method involves passing a direct current through the unknown resistance, and measuring that current directly by a galvanometer or other electromechanical current meter. A current measuring instrument placed in series with the source of current thus can be calibrated in resistance units to provide a direct display. Although the display is calibrated in resistance units, such as ohms, the factor actually measured is current, and a battery or other fixed source of current supplying a relatively constant potential, is involved. The said current is the quotient of $e/r$ which is an inherently reciprocal relationship. Thus a hyperbolic function results, producing a crowding of the scale toward the high resistance end.

The common prior art digital resistance measuring instrument makes use of a digital voltmeter calibrated in resistance units. For the measurement of low values of resistance it is common to pass a constant current through the unknown resistance element, and measure the voltage drop across it with the said digital voltmeter. The digital voltmeter, per se, affords more convenient and accurate readings than the well-known electromechanical analog instrument, but does not, itself, correct the non-linearity inherent in the measurement as discussed above.

For higher (megohm) ranges, it is common to apply a constant relatively high voltage across the unknown resistance and to insert a standard value (sensing) resistor in series in the current path. The digital voltmeter may then read the voltage drop across the reference resistor, providing a display calibrated in resistance units. This arrangement also provides an inherently non-linear measurement operation. Although the inherenet non-linear aspect of the measurement is not visually obvious as the digital display is viewed, it nevertheless manifests itself as a source of inaccuracy, in that the significance incremental resistance value change from an already relatively large initial value corresponds to a smaller change of current through the reference resistor and therefore a smaller change of voltage drop across it than would be the case with respect to a smaller initial resistance value. Thus, as the resistance value becomes higher and higher, a smaller "signal" (voltage across the reference resistor) results from a given change of resistance value.

The digital voltmeter which provides the indicating means for the ohmmeter/megometer understandably has a certain predetermined granularity, that is, each least significant digit change in the indication corresponds to a predetermined change of signal. As the slope of the measurable voltage as a function of resistance of the unknown "flattens out" at the higher ranges, the precision of measurement is obviously adversely affected.

In the prior art digital voltmeter arrangement commonly used, the signal (i.e., the voltage across the unknown resistance, or across the series sensing resistor, is used to charge or integrate linearly to a voltage value which is a function of the unknown resistance during a predetermined number of digital counts. The said predetermined number of digital counts constitutes a predetermined time which s constant for that number of counts since the device operates from a stable clockpulse generator. If the integration is thought of as a negative going ramp, having a negative final voltage during this first predetermined count period which is a function of the unknown resistance, then the basis for measurement and display can be a constant slope recharge (positive going ramp) a further count from the most negative point of the first ramp can then determine the point of crossover of the recharge ramp with the zero arbitrary signal level. The second or positive going ramp may be thought of as a reference integration, since it is effected with respect to a constant voltage reference rather than with respect to the signal representing the unknown resistance as is the case for the first ramp.

From careful examination, it will be realized that this arrangement reproduces essentially the same non-linearity in the basic measurement as results from the hereinbefore described prior art analog measurement techniques. One way of looking at this situation and the reason therefor, is in terms of the maximum negative point reached by the first or measurement ramp during the arbitrary predetermined initial count. The slope of this ramp is determined by the so-called signal, and that, in turn, follows the same hyperbolic law previously observed.

Many of the elements of the circuit hereinafter described in connection with the present invention will be recognized as well-known to those skilled in this art. Among these are the seven bar LED decimal digit display devices, the integrated circuit display drives for these LED devices, the counter registers, the integrated circuit operational amplifiers, and various other aspects of the circuit.

The manner in which the present invention deals with the described problems extant in connection with the prior art, will be understood as this description proceeds.

SUMMARY OF THE INVENTION

The present invention includes a unique concept for linearizing a scale of resistance values. A double ramp digital voltmeter operates to sense a voltage signal which itself is a hyperbolic function of an unknown resistance value. Rather than generating a first voltage ramp at a slope which is a function of the said unknown resistance value and integrating back at a slope determined by a constant reference source, the device of the present invention first integrates down at a constant slope during a predetermined count (i.e., a predetermined number of clockpulses), the said slope being determined by a constant reference. The slope of the second ramp or "up-integrating" ramp is determined by the signal (which, as previously pointed out, is itself a hyperbolic (reciprocal) function of the unknown resistance). The process of integrating back toward the initial level from the level established by the reference count introduces a compensating "mirror image" hyperbolic function so that the net effect is a linearized measurement.

In fact, if the digitally determined resistance value were converted to an analog value and displayed on a prior art electromechanical indicating meter, the scale would be linear. Stated otherwise, a measurement technique may be said to be provided which tends to "bunch" the scale at lower resistance values in a manner which compensates or cancels out the inheret hyperbolic relationship of the so-called signal to the value of the unknown resistance (bunching at the high end of the range).

In the example to be described hereinafter, an initial count of 2000 is used. During each measurement cycle, the forward or down integrating ramp is established for a period corresponding to 2000 counts. Thus it always arrives at the same voltage point, and from there, the up-integrating ramp or second half of the double ramp cycle occurs at a slope which is a function of the unknown resistance. The device may be actually thought of as a hyperbolic function generator of itself, and may well be put to uses other than herein described, once the principles of the invention are understood.

The term unknown resistance as used herein, as the variable to be measured, is to be understood to include the reactive component due to dielectric polarization and shunt capacitance effects as observed in certain time-resistance measurements, the said reactive component being substantially indistinguishable from a true resistance component.

BRIEF DESCRIPTION OF THE DRAWINGS

FIG. 2 is a graph of the double ramp function for megohm scales.

FIG. 3 is a graph of the double ramp function for a low resistance measuring scale.

DESCRIPTION OF THE PREFERRED EMBODIMENT

Figure 1:
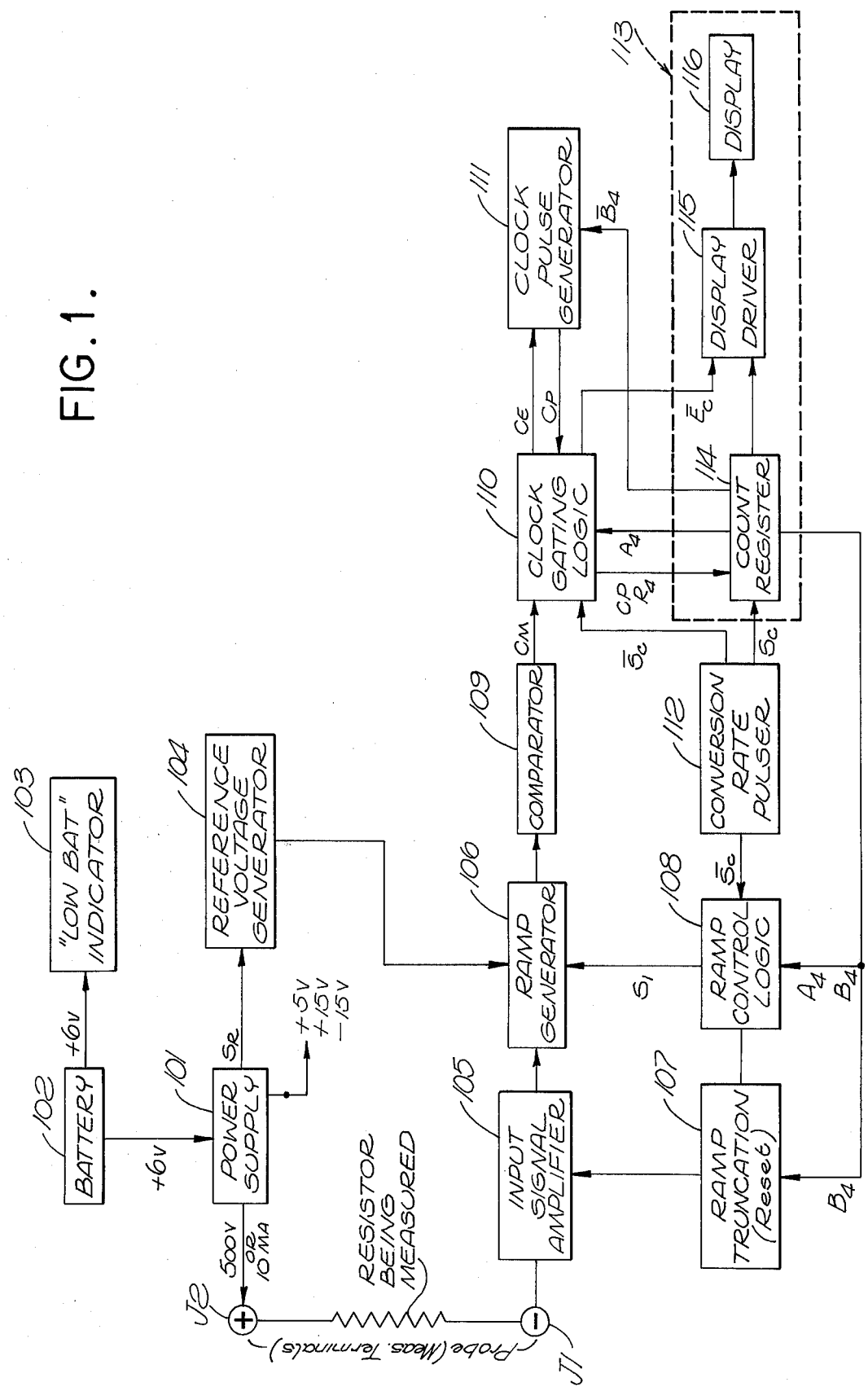
FIG. 1 is a block diagram depicting the system of a resistance measuring device in accordance with the present invention.

Before referring to the figures, some general characteristics of instruments of this class, and in particular, of the hereinafter described embodiment, will be give.

A typical complete instrument embodying the present invention includes ranges for low resistance (continuity) measurement and at least one megohm measuring range. In the low ohm mode, the instrument includes a constant current source, such that the unknown resistance is subjected to a predetermined and known value of current. The digital voltmeter within the instrument, measures the voltage across the unknown resistance resulting from application of the aforementioned constant current and, using conventional analog-to-digital conversion, presents a binary coded decimal display in ohms. Actually, the voltage across the unknown resistance is the parameter which is measured, however, in accordance with known relationships, the display is calibrated in ohms directly.

For the low resistance range, the so-called double-ramp integrator is employed much as hereinabove described in connection with prior art devices.

In the megohm range or ranges of the instrument, a closely regulated 500 volt source subjects the unknown to a constant voltage. The standard measurement (sensing) resistor is series with the regulated source and unknown element provides a means of developing a voltage drop proportional to the current flowing through the said unknown. The digital display is also directly calibrated in resistance, however, the double-ramp integrator circuit is of the novel type in which the first ramp integration is performed with respect to a substantially fixed reference and the second, or recovery ramp slope is determined by the said voltage drop across the sensing resistor. As indicated hereinbefore, the result is a linearized presentation. In effect, the display is a hyperbolic function of the voltage across the sensing resistor, this function having an opposite or mirror image shape as compared to the inherent hyperbolic relationship between sensing resistor voltage drop and actual resistance of the unknown. Stated otherwise, it may be said that the digital voltmeter, including this unique form of double-ramp integration, measures $1/e$ across the said sensing resistor. The sensing resistor is itself so small compared to even a low reading on the lowest of the megohm ranges, that it is a negligible error source in the resistance measurement.

The unique double-ramp integration device and technique herein described, is not necessarily limited in application to a digital megohm meter as described herein, but rather can be thought of as a generalized hyperbolic function generator. Thus, for process control, where a hyperbolic function is needed, or in devices where measurement of other electrical parameters is required, the unique double-ramp integrator digital voltmeter can be advantageously applied.

The particular embodiment herein described was constructed as a portable instrument, battery powered, and including integrated circuits and other solid state devices to make possible the inclusion of all required circuitry within a very small and light weight physical package.

For the purposes of this description, a zero to 200 ohm (continuity) resistance range has been selected for the low range. Three megohm ranges are selectively available, the first going from two to 20 megohms, the second from 20 to 200 megohms and the highest range reading from 200 to 2,000 megohms. Thus, the representative typical device described qualifies as a versatile piece of equipment for measuring resistances down to one-tenth of an ohm, and up to 2,000 megohms, the latter primarily for insulation integrity testing.

Referring now to FIG. 1, a structural and functional block diagram is given. The power supply 101 is of the electronic inverter type and supplies a positive five volt terminal and 15 volt positive terminal and 15 volt negative terminal, these voltages powering the electronic circuitry. Additionally, a plus 500 volt test signal voltage is generated for use in the megohm measurements, that voltage being electronically regulated. A constant current course providing approximately 10 milliamperes for use as a test signal on the zero to 200 ohms scale is also included. A rechargeable battery 102 is illustrated along with a low battery indicator 103. The said low battery indicator 103 is essentially a "go or no-go" device constructed to operate an indicator light whenever the battery voltage drops below a predetermined point indicating the need for recharge. The components 101, 102 and 103 are block illustrated for the sake of completeness, but do not constitute any part of the novel structure of themselves. The power supply 101, in addition to producing the plus 5 volt, plus 15 volt and minus 15 volt supply voltages and the plus 500 volt megohm test voltage, contains a voltage divider and a current regulator for producing two signals $S_R$ and KI. $S_R$ is a voltage divider down from the 500 volts to approximately 7.5 volts in a circuit which operates to vary the signal $S_R$ slightly in agreement with variations in the 500 volt supply. The current regulator which generates KI operates from the plus 5 volt power bus, and generates a constant current of approximately 10 milliamperes. This regulator operates to slightly vary this current in agreement with fluctuations in the plus 5 volt supply. As this description proceeds, reason for this interdependence will be evident, especially in connection with FIGS. 4 through 12. Briefly, it is intended as a partial compensation for changes in the refernce generator 104 output due to direct current power supply output variations.

Before proceeding with the description of the specific instrumentation, some further general information appears to be in order.

The art in respect to power supply design and construction is so well known that further details appear not to be necessary.

As the functional blocks of FIG. 1 are described, reference will be made to corresponding individual circuits presented in FIGS. 4 through 13. Logical signals appearing on the interconnecting leads of FIG. 1 will also be found on those detailed circuits and accordingly, a full understanding of the structure and function will be obtainable.

Throughout the schematic diagrams, two types of grounds or circuit return symbols, are used. These are downward pointing triangles, some with the letter S within them and the others with the letter P within them. These are to be understood to refer to signal and power ground or return points, respectively. Both of these grounds are joined at the battery negative terminal, however, they are carried separately throughout the circuits to minimize interaction. Looking ahead at the figures, a number of selector switches will be noted. The label SW preceding a number such as 1a, 2b, etc., will be noted. It is to be understood that each switch section identified as SW with the same numeral thereafter, is ganged to each other section with the same numeral. Thus SW1a, b, c, and d are ganged and operated simultaneously, etc. Switches SW1 through 4 are discretely operated selector switches (exclusive) and SW5 operates momentarily as a "Read Enable." Circuitwise, SW5 enables the power supply. All semi-conductor of the device of the invention come into operation substantially without delay when SW5 is activated. Table I, following relates these switches to the measurement ranges.

TABLE I

| Switch Symbol | Function |
| --- | --- |
| SW1 | 2000 M ohms |
| SW2 | 200 M ohms |
| SW3 | 20 M ohms |
| SW4 | 200 ohms |
| SW5 | Read Enable (Momentary) |

In order to have an understanding of the logic of the conversion (measurement cycle) sequence, a synopsis of this sequence constituting a broad description of the circuit operations, follows:

CONVERSION (MEASUREMENT CYCLE) SEQUENCE 0.0 QUIESCENT STATE 0.1 Integrator (ramp generator) is clamped with slightly positive output.

1.0 START OF CONVERSION 1.1 The pulser generates a Start Conversion pulse ($S_c$).

1.2 $S_c$ sets switch control flip-flop (F).

1.3 $S_c$ resets the counter chain.

2.0 OHMS MODE 2.1 Flip-flop F outputs are gated with M and $\overline{M}$ to keep $S_1$(which is $Q_2$) closed prior to $S_c$ and to open $S_1$ at $S_c$.

2.2 $S_1$ opening allows the integrator to charge negatively for 1000 counts, (approximately −1.5 to −4.5 volts, depending on input signal amplitude.) The input signal is derived from the IR drop across circuit under test.

2.3 The integrator output passing through zero in a negative direction causes the comparator output ($C_m$) to go low. $C_m$ going low sets zero hold-off flip-flop (G) and enables the clock ($C_p$). (Either G being low or $C_m$ being low enables $C_p$).

2.4 A count of 1000 is detected ($A_4$ going high) resetting flip-flop F and closing $S_1$.

2.5 $S_1$ closing allows the integrator to discharge in a positive direction at a rate which is a funciton of the reference current. Duration of the discharge is therefore proportional to the peak amplitude reached during the negative charging cycle.

2.6 A count of 2000 is detected ($A_4$ going low) resetting flip-flop G which in turn resets $B_4$. All counter outputs are then zero.

2.7 The integrator output passing through zero in a positive direction causes $C_m$ to go high which in turn disables $C_p$ provided G has been reset. The gate function $\overline{C_m} \cdot \overline{G}$ provides an end-of-conversion signal ($E_c$) which is employed to transfer the data present in the counters to the latches and thereby to the display.

2.8 Should the counter reach a second count 2000, $\overline{B}_4$ will inhibit the clock and hold the full range count.

3.0 MEGOHMS MODE 3.1 Flip-flop F outputs are gated with M and $\overline{M}$ to keep $S_1$ open prior to $S_c$ and to close $S_1$ at $S_c$.

3.2 $S_1$ closing allows the integrator to charge negatively for 2000 counts (approximately −4.5 volts - slope is determined by the reference voltage).

3.3 The integrator output passing through zero in a negative direction causes the comparator output ($C_m$) to go low. $C_m$ going low sets zero hold-off flip-flop (G) and enables the clock ($C_p$). (Either $\overline{G}$ being low or $C_m$ being low enables $C_1$).

3.4 A count of 2,000 is detected ($B_4$ going high) resitting flip-flop F and opening $S_1$. (Flip-flop G is also reset in turn resetting $B_4$.)

3.5 $S_1$ opening allows the integrator to discharge in a positive direction at a rate which is a function of the input current. Duration of the discharge is inversely proportional to the amplitude of the input current.

3.6 The integrator output passing through zero in a positive direction causes $C_m$ to go high which in turn disables $C_p$, provided G has been reset. The gate function $\overline{C_m \cdot G}$ provides an end-of-conversion signal ($E_c$) which is employed to transfer the data present in the counters to the latches and thereby to the display.

3.7 Should the counter reach a second count 2000, $\overline{B_4}$ will inhibit the clock and hold the full range count. The logic terminology and Table II, follow:

LOGIC TERMS

| | |
|---|---|
| $S_r$ | Start Conversion (Generated by Pulser) |
| F | Switch Control Flip-Flop |
| M | Megohms Mode |
| $\overline{M}$ | Ohms Mode |
| $S_1$ | Integrator (Ramp Generator) Input Signal Switch |
| $C_m$ | Comparator Output |
| G | Zero Hold-Off Flip-Flop |
| $A_4$ | Count of 1000 |
| $B_4$ | Count of 2000 |
| $E_c$ | End Of Conversion |
| $C_e$ | Clock Enable |
| $C_s$ | Clock Start |
| $C_p$ | Clock |
| $R_4$ | Reset for $A_4$ and $B_4$ |
| $R_s$ | Reset for $A_4$ through $D_3$ of count register-(all digits except most significant) |

TABLE II

| LOGIC FUNCTION | MECHANIZATION |
|---|---|
| $S_c = S_F$ | $\overline{S_c} = \overline{S_F}$ |
| $S_c = R_s$ | $S_c = R_s$ |
| $\overline{M} \cdot \overline{F} + M \cdot F = S_1$ | $\overline{M \cdot F} = \overline{M \cdot F} = S_1$ |
| $\overline{M} \cdot A_4 = M \cdot B_4 = R_F$ | $\overline{M} \cdot A_4 + M \cdot B_4 = \overline{R_F}$ |
| $C_m \downarrow = S_G$ | $C_m \downarrow = \overline{S_g}$ |
| $A_4 \downarrow = R_G$ | $A_4 \downarrow = \overline{R_G}$ |
| $C_m \downarrow = C_s$ | $\overline{C_m \cdot G} = C_s$ |
| $(\overline{C_m} + G) \overline{B_4} = C_e$ | $\overline{C_m \cdot G \cdot B_4} = C_e$ |
| $G \downarrow = R_B 4$ | $G \downarrow + \overline{S_r} = R_4$ |
| $\overline{G} \cdot C_m \uparrow = E_c$ | $\overline{C_m \cdot G \downarrow} = \overline{E_c}$ |

Figure 5:
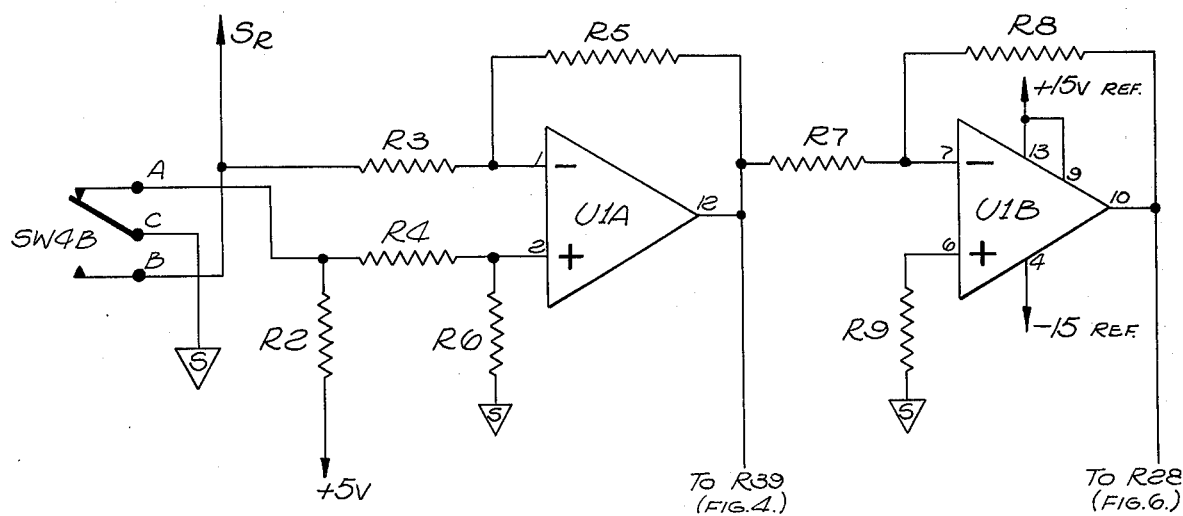
FIG. 5 is a diagram of the circuit of the reference voltage generator in an embodiment of the present invention, as illustrated in FIG. 1.

Again referring to FIG. 1, it will be noted that the reference voltage generator 104 is depicted in the form of a detailed circuit in FIG. 5. This voltage generator 104 comprises a pair of integrated circuit operational amplifiers connected as unity gain buffer amplifiers. Secion B of SW 4 operates to select between the 5 volt supply applied to the non-inverting input of the first buffer U1a for the 200 ohm range, and a voltage $S_R$ derived from the 500 volt power supply is applied to the inverting input of the first buffer for the megohm ranges. This voltage $S_R$ is on the order of 7.5 volts and comes from a special regulator within the power supply. The output of the first buffer U1a is connected to the inverting input of the second buffer U1b. The outputs of these buffers provide the reference voltages of equal and opposite polarity. These references which are plus and minus 5 or 7.5 volts are applied in one polarity for the 200 ohm scale measurement, and in the other polarity (i.e., reversed) when one of the megohm scales is selected.

Figure 4:
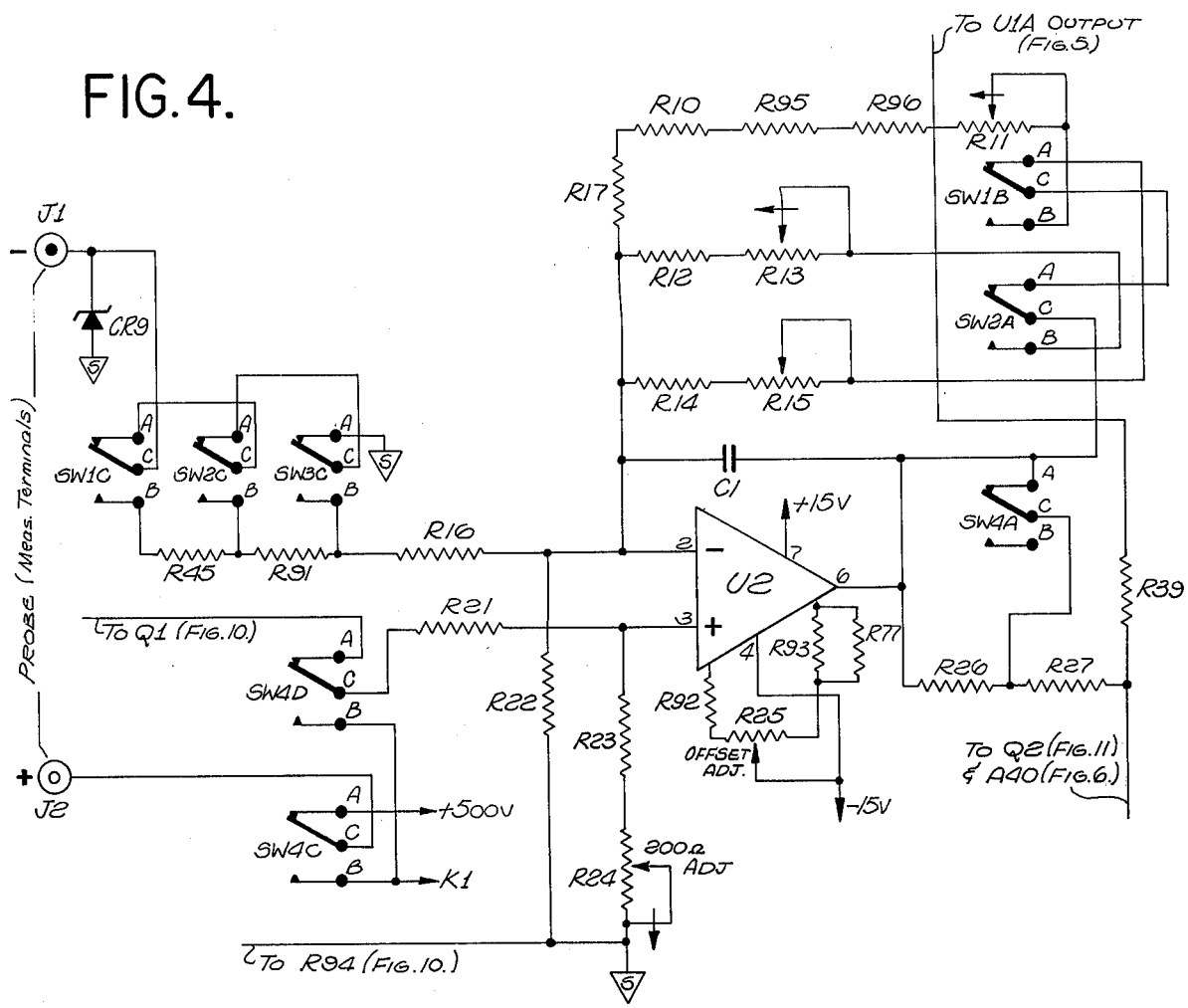
FIG. 4 is a circuit diagram of the input signal amplifier in an arrangement according to the present invention, as illustrated in FIG. 1.

The input signal amplifier 105 of FIG. 1 is depicted in circuit detail in FIG. 4. This input signal amplifier is an integrated circuit operational amplifier and associated circuitry with switching in the input and feedback circuits. In the 200 ohm (low resistance measurement) range, the constant current KI is applied to the positive probe terminal J2 and the voltage drop across the said unknown resistance produces a voltage signal input through a divider comprising R21, R23 and R24 (FIG. 4) into the non-inverting input of the operational amplifier U2. The output of operational amplifier U2 is fed back from its terminal 6 through a resistor network and SW2A and SW1B to the inverting input of U2, and from there to the signal ground through R22. The output amplitude of U2 is proportional to the current flowing in the resistor under test.

In a megohm ranges the plus 500 volt supply is applied to the resistance being measured through SW4C which is always in the position illustrated, i.e., with continuity between its terminals $a$ and $c$, except in the low ohms range. The current through this unknown resistance returns through J1, the negative probe terminal. Thus it will be seen from FIG. 4, that the current through the feedback resistors is equal to the current through R16, the latter being the current flowing in the unknown resistance. The switches SW1C, SW2C and SW3C operate to selectively switch additional series resistances comprising either R16, R16 plus R91, or the sum of those two and R45 into the circuit, depending upon the selection among those switches. Thus, an AC voltage gain adjustment is effectively made at the inverting terminal of the operational amplifier U2. These expedients are necessary in order to stabilize the digital readings against AC noise capacitively coupled through the resistance under test. High impedance terminals are commonly subject to noise and AC hum pickup, factors which would deteriorate the performance of the instrument, except for these AC voltage gain adjustment expedients. From the output terminal 6 of U2, a network of feedback resistors leads to the inverting input terminal of U2, these being selected by the settings SW1B, SW2A or SW4A, to control the feedback and also therefore the gain of U2.

The non-inverting operational amplifier input of U2 is grounded during the analog-to-digital conversion process and the output is fed back to the inverting input through the aforementioned feedback resistors and selector switches. This feedback drives the inverting output to a "virtual" ground by causing the feedback current to be equal and opposite to the current from the resistance under test. The output voltage is thus proportional to that current through the resistance under test.

The ramp generator or integrator 106 of FIG. 1 is the device which produces the double-ramp waveform illustrated for the megohm scales at FIG. 2 and for the low resistance or continuity scale at FIG. 3. These figures are extensively annotated and are believed to be self-explanatory. The manner in which the digital register count relates to these waveforms will be more fully understood as this description proceeds. FIGS. 2 and 3 substantially explain these relationships.

Figure 6:
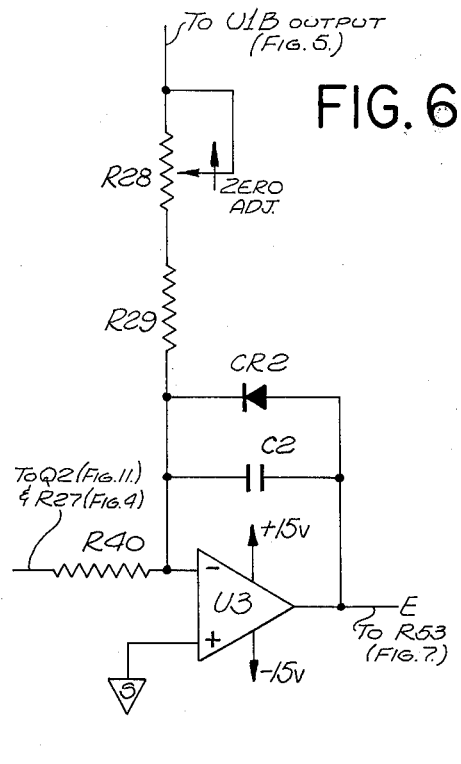
FIG. 6 is a circuit diagram of the ramp generator (integrator) in accordance with the present invention, as illustrated in FIG. 1.

The said ramp generator (integrator) 106 is represented in circuit detail at FIG. 6. Basically the ramp generator is an integrated circuit operational amplifier with associated circuitry connected to cause it to operate as an integrator. A feedback capacitor C2 and diode CR2 are connected in parallel between the output and the inverting input of the operational amplifier U3. The non-inverting operational amplifier input is grounded. Thus the output is either clamped at its maximum voltage (a fraction of volt above ground) or it is casued to vary at a rate proportional to the current into the inverting input. The output voltage of the said integrator is equal to the time integral of the current into the inverting input.

The current into the input at R40 in FIG. 6 is the algebraic sum of a current from the second reference voltage source and the current from another resistor. The upper end of this additional resistor is connected to two resistors, to the first reference voltage source and to the output of the input amplifier. A three-way junction between resistors R27, R39 and R40 is thus formed, and this junction point is subject to the switching action of Q2. Thus, the junction of these three resistors will be grounded by Q2 when the latter is closed, that transistor constituting a ramp switch. It will be further noted that when this ramp switch is closed, the input to the integrator is a current from the second reference voltage source only, i.e., current flows from U1b through R28 and R29 into the inverting input of U3. When Q2 is open, the input to the integrator is the algebraic sum of the current from that source, from the first reference voltage source U1a through R39, and from the output of the amplifier U2 through R26 and R27 (see FIGS. 4 and 5 also). The value of the series resistor is either R27 or R26 plus R27, depending upon the setting of SW4A. Thus, the current contribution from U2 is controlled suitably between the low ohm and the megohm ranges.

The values of the aforementioned resistors used to sum the currents at the operational amplifier input U3 and of the feedback, input and offset resistors in the input signal amplifier (FIG. 4) are chosen and adjusted to produce the following ramp slew rate conditions (a) and (b) on the 200 ohm scale and (c) and (d) on the megohm scale as follows:

a. Equal and opposite slew rates of the ramp generator when the ramp switch Q2 is open and when it is closed with zero ohms across the probe terminals on the 200 ohm range.

b. Three times this slew rate with the ramp switch Q2 open and 200 ohms across the measurement terminals on the 200 ohm range.

c. Equal and opposite slew rates of the ramp generator when the ramp switch is closed and when it is open on each megohm scale with the full scale resistance for the corresponding range placed across the measurement terminals, i.e., either 2,000, 200 or 20 megohms.

d. A zero slew rate with the ramp switch open and an open circuit at the measurement terminals on each of the megohm ranges.

Figure 10:
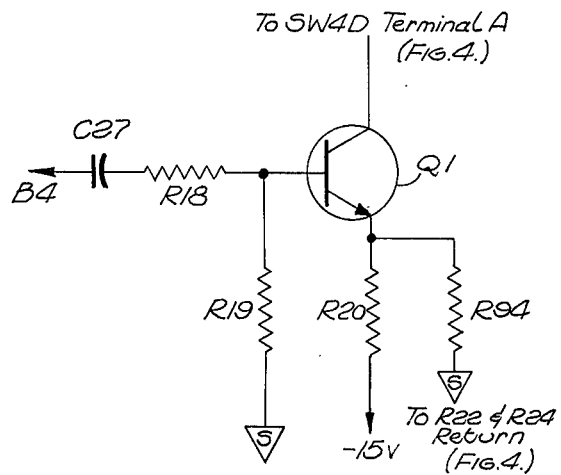
FIG. 10 is a typical circuit for a ramp truncation (reset) circuit, as illustrated in FIG. 1.

Considering now the ramp truncation (reset) circuit 107 on FIG. 1, it is noted that this circuit is represented in detail in FIG. 10. This circuit may also be called the open circuit ramp reset circuit, and comprises a transistor Q1 and associated circuitry connecting it as a switch. That switch operates to connect the non-inverting input of the input signal amplifier operational amplifier U2 of a negative voltage thus effecting a rapid return of the ramp generator to its quiescent (clamped) condition. This switch is actuated when the full scale count is reached on the megohm scales through signal B4 coming from U20 (in the count register or counter change in FIG. 13).

Figure 11:
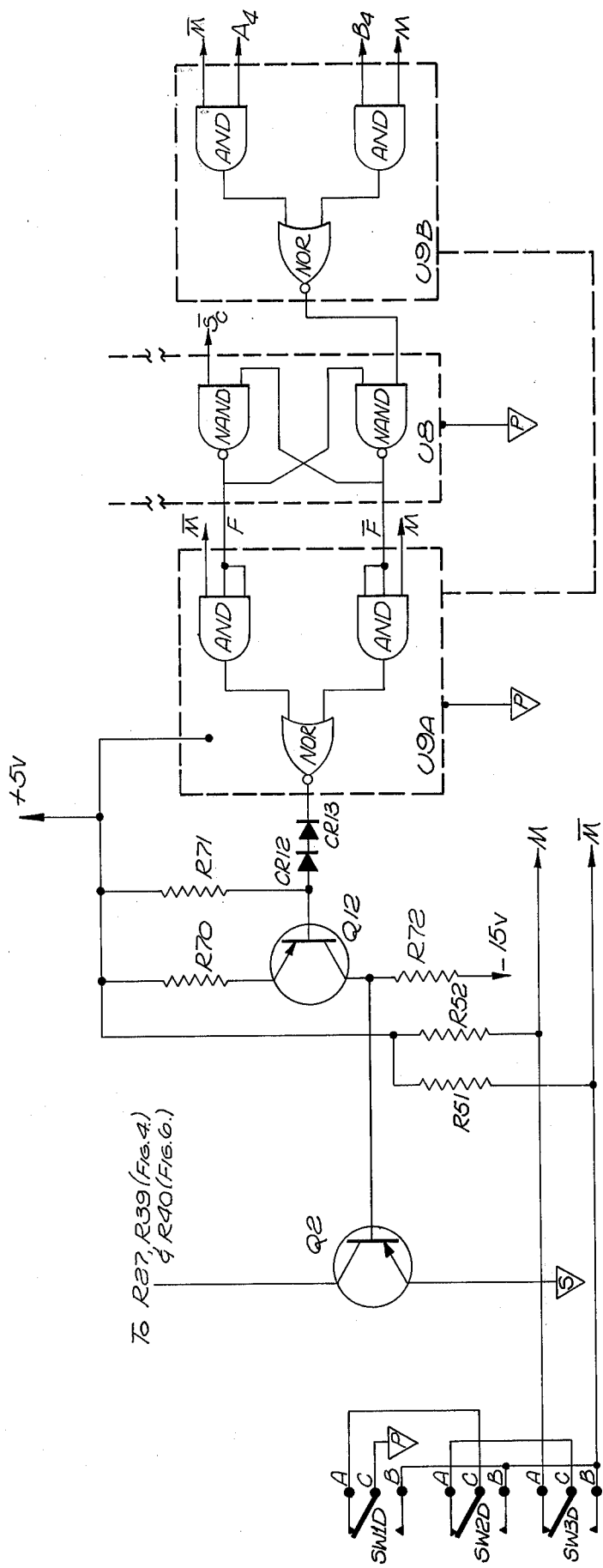
FIG. 11 shows a typical circuit for the ramp control logic block of FIG. 1.
Figure 13:
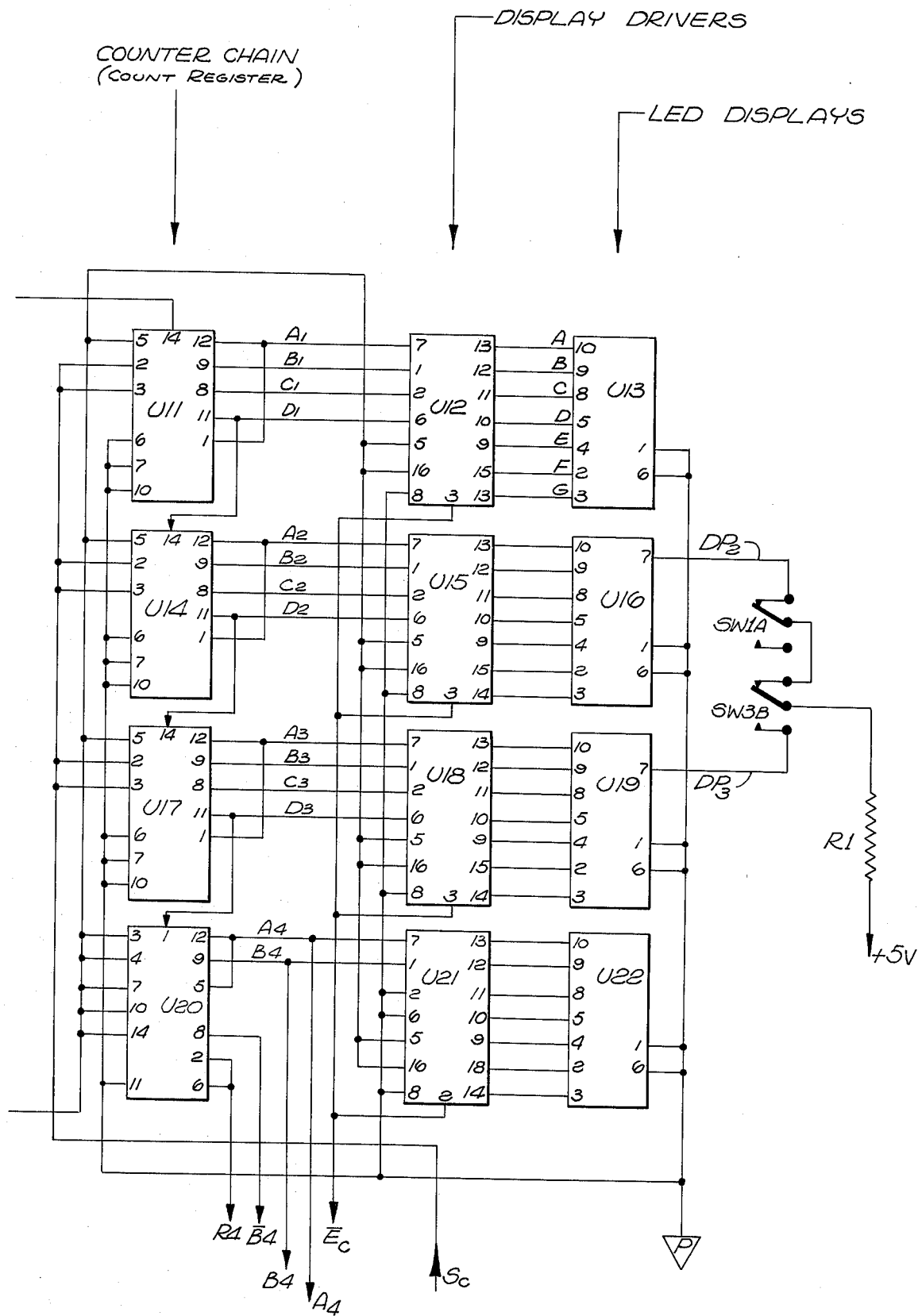
FIG. 13 illustrates typical circuits for the display components illustrated in block form in FIG. 1.

Referring now to the ramp control logic block 108 on FIG. 1, it will be noted that the details of this circuit are shown in FIG. 11.

The ramp control logic consists of integrated circuit logic gates and associated circuitry to actuate the transistor ramp switch Q2. The ramp control logic circuit receives signals A4 and B4 from the count register (FIG. 13) to produce the following sequences:

a. On the 200 ohm range, the ramp switch Q2 is closed in the quiescent state.

b. The "start conversion" signal $\overline{S}_c$ from the Conversion Rate Pulser (to be described in connection with FIG. 12) opens Q2. $\overline{S}_c$ is actually fed into a NAND circuit in U8B and passes through the AND circuit and NOR circuit chain of U9a and into Q12 to effect this operation.

c. The first "1000 count" $A_4$ signal from the count register closes Q2 through a chain including an AND and a NOR circuit in U96 and additional NAND circuit in U8, as well as an AND and NOR circuit in U9a into Q12. Q2 thus remains closed until the next "start conversion signal" $\overline{S}_c$ from the conversion rate pulser aforementioned.

Referring now to the operation of the same circuits in connection with the megohm ranges, it will be noted that:

a. The ramp switch is open in a quiescent state.

b. The "start conversion" signal $\overline{S}_c$ closes Q2 as aforementioned.

c. The first "2000 count" signal $B_4$ from the count register opens Q2 and it remains open until the next "start conversion" signal $\overline{S}_c$.

The logic of the arrangement in FIG. 11 is relatively straightforward and readily understood by those skilled in this art. It will be noted that the two NAND circuits of U8B together comprise the flip-flop F.

Figure 7:
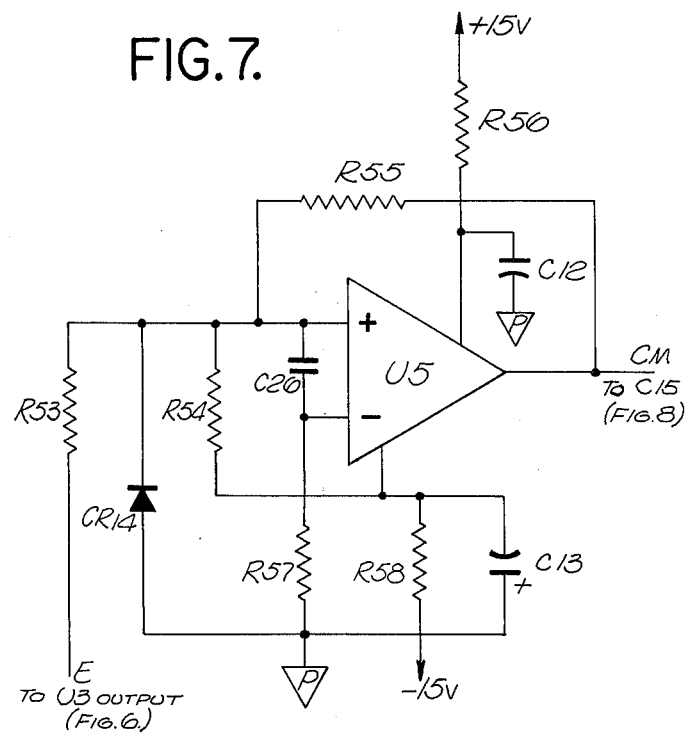
FIG. 7 is a circuit diagram for the comparator of the described embodiment, per FIG. 1.

Referring now to the comparator, Block 109 in FIG. 1, it will be noted that FIG. 7 shows detailed circuitry appropriate for this function. The comparator is basically an operational amplifier and associated circuitry connected to operate a voltage comparator with appropriately controlled hysteresis. The input voltage is the output of the ramp generator taken from U3 terminal 6. That output is introduced into operational amplifier U5 non-inverting input in the comparator circuit through resistor R53. The comparator output "switches high" when the input is above ground potential and "switches low" when the input potential is below ground. This is accomplished to insure the timely operation of the clock and logic circuits, and explains the small difference between start conversion and start clock and also between stop clock and reclamp, as illustrated on FIGS. 2 and 3.

Figure 8:
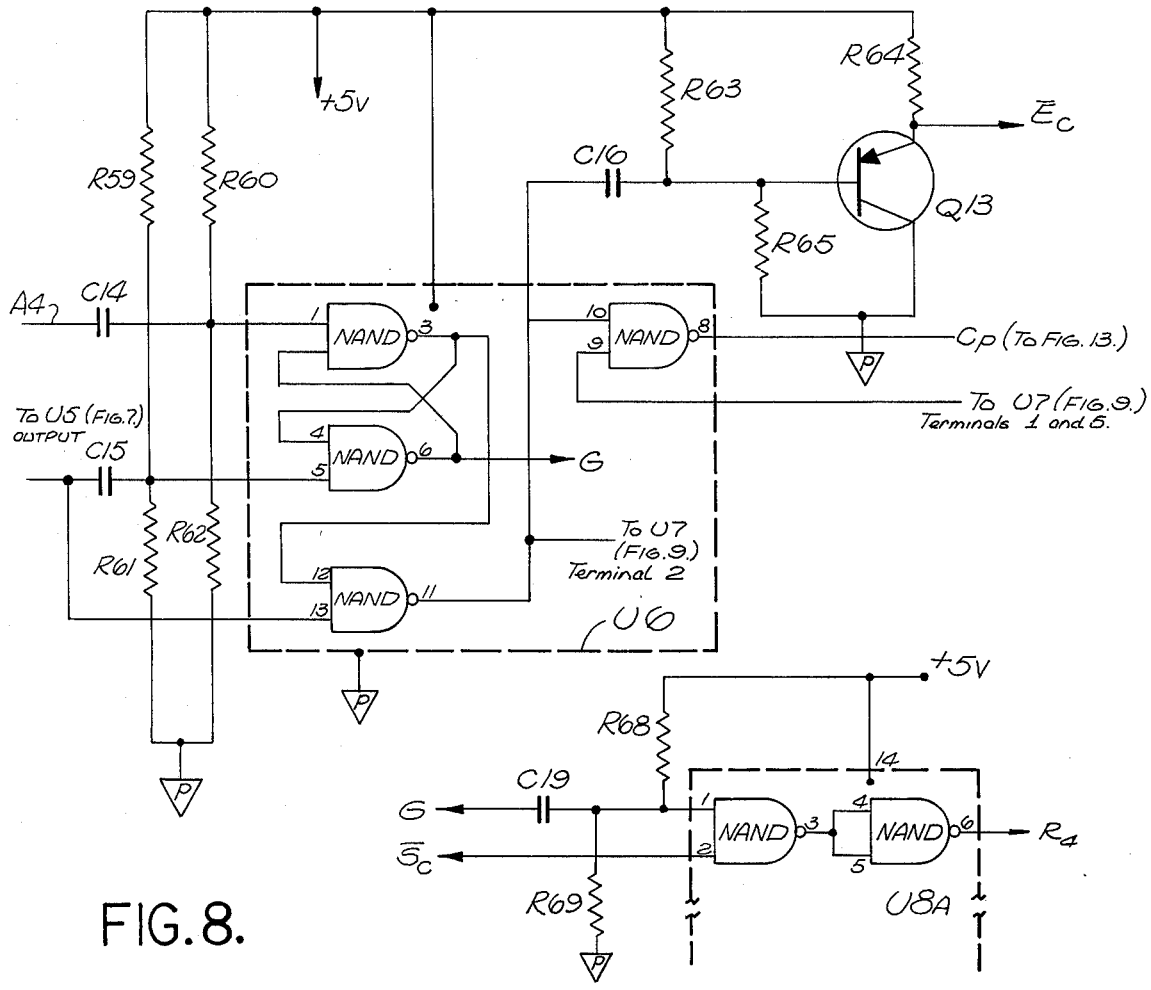
FIG. 8 is a circuit diagram for typical clock-gating logic circuits as shown in FIG. 1.

Referring now to the clock gating logic 110 of FIG. 1, it will be noted that a detailed circuit for this block is shown at FIG. 8.

The clock gating logic basically comprises an integrated circuit logic gate arrangement and associated components interconnected to perform the following functions:

a. Start the clock pulse generator and gate the clock pulses to the count register when the output of the comparator "switches low."

b. Reset the count register when the "start conversion" signal occurs or at the first "2000 count" signal $B_4$.

c. Stop the clock when the comparator is high and the "2000 count" $B_4$ has occurred.

d. Send out an "end of conversion" signal $\overline{E}_c$ when the clock is stopped. That signal transfers the count from the count register to the display driver (FIG. 13), thereby enabling the display.

Figure 9:
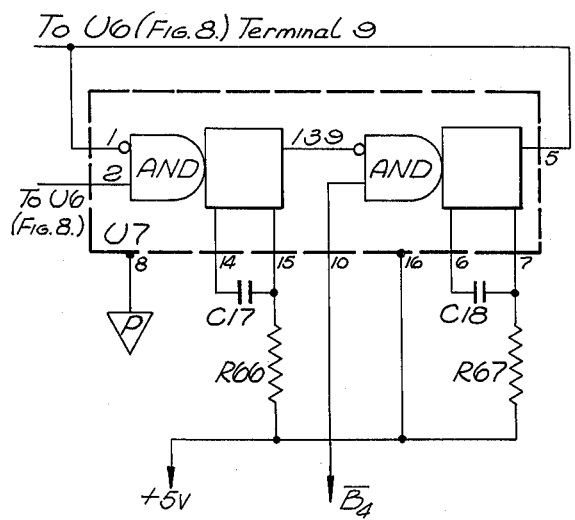
FIG. 9 is a circuit diagram for a typical clock-pulse generator as shown in FIG. 1.

Referring now to the clock-pulse generator 111 on FIG. 1, it will be noted that a suitable circuit for this element is depicted in FIG. 9. Actually the circuit of FIG. 9 includes an integrated circuit U7, particularly adapted for the generation of equally spaced pulses at a frequency of approximately 250 KH$_z$, typically.

Figure 12:
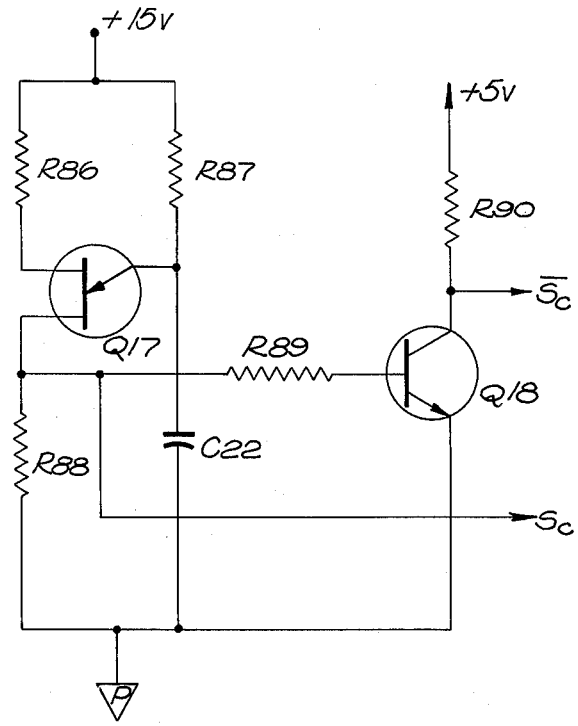
FIG. 12 shows a typical circuit for the conversion rate pulser block illustrated in FIG. 1.
Figure 14:
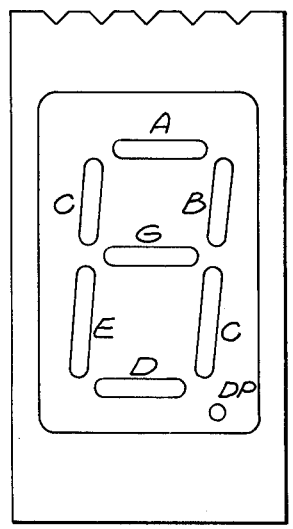
FIG. 14 is a representation of a typical seven bar LED display device suitable for use in the present invention.

Referring now to the Conversion Rate Pulser 112 in FIG. 1, it will be noted that detailed circuit for this block is provided in FIG. 12. Basically this unit comprises a unijunction transistor operating as a relaxation oscillator feeding a transistor amplifier circuit, Q17 and Q18, respectively. The circuit constants are such as to produce the $S_c$ and $\overline{S}_c$ signal at a rate of approximately 2 Hz. The signal $S_c$ is also supplied for display logic purposes. The signal $\overline{S}_c$ is a short negative going pulse at the aforementioned 2 Hz repetition rate.

The dotted block 113 of FIG. 1 comprises the display components including the count register 114, the display drivers 115 and the LED display itself 116. These components are illustrated in detail in FIG. 13. Basically a decimal display is effected through a count register arrangement, a display driver arrangement, and four LED display units. This type of display is well understood in this art and it will be apparent to those skilled in this art how it is caused to count at the clock rate and is started and stopped. The count register is composed of integrated circuit flip-flop registers and flip-flops interconnected as a binary-coded-decimal count register. The display driver is composed of integrated circuit latching decoder-drivers. Those circuits decode a binary-coded-decimal digit of the count register and drive the seven bar segments of the digital LED display accordingly.

The said digital display is composed of seven segment (and decimal point) light emitting diode (LED) digital displays. The proper decimal point is selected by the range selection switches and is introduced at DP$_2$ and DP$_3$ from switches SW1A and SW3B. The signal $\overline{E}_c$ is an end of conversion signal generated by transistor Q13 in the FIG. 8 circuitry. The instructions to stop counting are dictated through the logic circuits of the End of Conversion Signal Generator within the clock-gating logic circuits of FIG. 8 which in turn have been controlled from the comparator (FIG. 7).

For assistance in understanding the circuit presented more completely, the following Table III is given. In Table III typical circuit parameters and types by well known industry designations are given.

TABLE III

| FIGURE NO. | COMPONENT | TYPICAL VALUE OR TYPE |
|---|---|---|
| 4 | C1 | .022 UF, 50V |
| 4 | CR9 | IN5240 |
| 4 | R10 | 1MEG 1% |
| 4 | R11 | 2000M |
| 4 | R12 | 383K 1% |
| 4 | R13 | 100K |
| 4 | R14 | 38.3K 1% |
| 4 | R15 | 10K |
| 4 | R16 | 20K |
| 4 | R17 | 1MEG 1% |
| 4 | R21 | 29.4K 1% |
| 4 | R22 | 29.4K 1% |
| 4 | R23 | 29.4K 1% |
| 4 | R24 | 10K |
| 4 | R25 | 1K |
| 4 | R26 | 6.04K 1% |
| 4 | R27 | 2.00K 1% |
| 4 | R39 | 15.0K 1% |
| 4 | R45 | 1.8M |
| 4 | R77 | (SIT) |
| 4 | R91 | 180K |
| 4 | R92 | 9.53K 1% |
| 4 | R93 | 10.01 1% |
| 4 | R95 | 1MEG 1% |
| 4 | R96 | 1MEG 1% |
| 4 | U2 | SN 7277IP |
| 5 | R2 | 15.0K 1% |
| 5 | R3 | 30.1K, 1% |
| 5 | R4 | 15.0K 1% |
| 5 | R5 | 30.1K,1% |
| 5 | R6 | 30.1K 1% |
| 5 | R7 | 10.0K, 1% |
| 5 | R8 | 10.0K, 1% |
| 5 | R9 | 5.1K |
| 5 | U1 | μA747 |
| 6 | C2 | .22 UF, 50 V |
| 6 | R28 | 10K |
| 6 | R29 | 53.6K 1% |
| 6 | R40 | 5.36K, 1% |
| 6 | U3 | SN 72741P |
| 6 | CR2 | JAN IN 4148 |
| 7 | C12 | 1 UF 50V |
| 7 | C13 | 1 UF 50V |
| 7 | C26 | .01 100V |
| 7 | CR14 | JAN IN 4148 |
| 7 | R53 | 3.3K |
| 7 | R54 | 510K |
| 7 | R55 | 150K |
| 7 | R56 | 510 OHMS |
| 7 | R57 | 3.3K |
| 7 | R58 | 2.4K |
| 7 | U5 | SN 72710L |
| 8 | C14 | 22 0PF 200V |
| 8 | C15 | 470PF 200V |
| 8 | C16 | 22 0PF 200V |
| 8 | C19 | 220PF |
| 8 | Q13 | 2N2907 |
| 8 | R59 | 10K |
| 8 | R60 | 10K |
| 8 | R61 | 15K |
| 8 | R62 | 15K |
| 8 | R63 | 30K |
| 8 | R64 | 10K |
| 8 | R65 | 30K |
| 8 | R68 | 10K |
| 8 | R69 | 15K |
| 8 | U8 | SN 74L00N |
| 9 | C17 | 300PF 300V |
| 9 | C18 | 300PF 300V |
| 9 | R66 | 20K |
| 9 | R67 | 20K |
| 9 | U7 | SW 74123N |
| 10 | C27 | 1.2 UF20V |
| 10 | R18 | 30K |
| 10 | R19 | 10K |
| 10 | R20 | 15K |
| 10 | R94 | 100 OHMS |
| 10 | Q1 | 2N2222 |
| 11 | Q2 | 2N 2907 |
| 11 | Q12 | 2N 2907 |
| 11 | CR12 | JAN IN 4148 |
| 11 | CR13 | JAN IN 4148 |
| 11 | R51 | 20K |
| 11 | R52 | 20K |
| 11 | R70 | 750 OHMS |
| 11 | R71 | 6.2K |
| 11 | R72 | 4.7K |
| 11 | U8 | SN 74L00N |

TABLE III-Continued

| FIGURE NO. | COMPONENT | TYPICAL VALUE OR TYPE |
| --- | --- | --- |
| 11 | U9 | SN 74L51N |
| 12 | C22 | 1.2 UF 20V |
| 12 | Q17 | 2N2646 |
| 12 | Q18 | 2N2222 |
| 12 | R86 | 100 OHMS |
| 12 | R87 | 330K |
| 12 | R88 | 15OHMS |
| 12 | R89 | 4.7K |
| 12 | R90 | 10K |
| 13 | U11 | SN 74L90N |
| 13 | U12 | 9368 |
| 13 | U13 | FND 70 |
| 13 | U14 | SN 94L90 74L90N |
| 13 | U15 | 9368 |
| 13 | U16 | FND 70 |
| 13 | U17 | SN 74L90N |
| 13 | U18 | 9368 |
| 13 | U19 | FND 70 |
| 13 | U20 | SN 74L3N |
| 13 | U21 | 9368 |
| 13 | U22 | FND 70 |

It will be evident to those skilled in this art that considerable variation of the detailed circuits employed herein, is possible once the invention is understood. The art of logic circuit design is well developed, making this possible.

It is not intended that the drawings or this description shall be considered as limiting the scope of the invention. The said drawings and this description are to be regarded as illustrative and typical only.

What is claimed is:

1. In an electrical resistance measuring instrument having a digital display calibrated in resistance units, means for applying a test voltage across an unknown resistance to be measured, a feedback operational amplifier for producing a voltage signal proportional to the current through said unknown resistance, means for measuring the voltage signal and for producing and supplying to said display, a digital code which is a function of said voltage signal, the combination comprising:
   a double ramp integrating circuit;
   a source of reference voltage of a predetermined magnitude;
   digital timing means including a clock pulse generator and counting means controlled thereby;
   and control means associated with said timing means and said integrating circuit for integrating said reference voltage in a first sense for a first period predetermined by said timing means and for integrating said voltage signal in a second sense which is the reverse of said first sense for a subsequent second period ending substantially at the time the output of said integrating circuit returns to its initial condition extant before said first integration, said control means also being operative to provide a digital output signal representative of the duration of said second integration.

2. Apparatus according to claim 1 including a digital display responsive to said digital output signal.

3. Apparatus according to claim 2 in which said control means includes a low frequency conversion rate pulser connected to cyclically initiate the operation of circuits including said digital timing means, said integrating circuit and said display to facilitate a series of measurement cycles at said low frequency.

4. Apparatus according to claim 3 in which said timing means includes a digital count register connected to count the pulses of said clock generator for a predetermined number of counts following each pulse from said conversion rate pulser, to initiate said integrator second period of integration, and to count anew from said initiation of second period of integration to provide said digital output signal.

5. Apparatus according to claim 4 in which said display comprises a plurality of seven bar LED numerical display units, one of said units being provided for each digit of the maximum resistance value to be measured.

6. Apparatus according to claim 4 in which said control means comprises a solid state switch connected to cause said integrator to reach a quiescent condition and to hold said integrator in said quiescent condition at said initial condition when open and to permit said integration to start when closed.

7. Apparatus according to claim 4 in which said predetermined number of counts following each pulse from said conversion rate pulser to said reset of said integrator is the maximum allowed count of said digital count register.

8. Apparatus according to claim 7 in which said control means comprises means for recognizing the point at which said integrating circuit return to said initial condition at the end of said second integration period, said means being operative to stop the counting of said register at that time, and including means for enabling said LED display thereafter.

9. Apparatus according to claim 8 including means for generating said reference voltage in operative relationship with said test voltage whereby small variations in said test voltage are reflected as compensatory variations in said reference voltage.

* * * * *